(12) United States Patent
Cooper

(10) Patent No.: US 11,506,333 B1
(45) Date of Patent: Nov. 22, 2022

(54) ADAPTER AND LEVELING BASE FOR UTILITY VEHICLE MOUNTED GRILL

(71) Applicant: Joseph Carl Cooper, Glencoe, AR (US)

(72) Inventor: Joseph Carl Cooper, Glencoe, AR (US)

( * ) Notice: Subject to any disclaimer, the term of this patent is extended or adjusted under 35 U.S.C. 154(b) by 0 days.

(21) Appl. No.: 17/327,307

(22) Filed: May 21, 2021

(51) Int. Cl.
  *F16M 13/02* (2006.01)
  *F16C 11/06* (2006.01)
  *B60R 9/06* (2006.01)

(52) U.S. Cl.
  CPC .............. *F16M 13/022* (2013.01); *B60R 9/06* (2013.01); *F16C 11/06* (2013.01)

(58) Field of Classification Search
  CPC .......... F16M 13/022; B60R 9/06; F16C 11/06
  USPC ................................. 248/231.9; 126/25, 276
  See application file for complete search history.

(56) References Cited

U.S. PATENT DOCUMENTS

| | | | | |
|---|---|---|---|---|
| 3,913,878 A * | 10/1975 | Wayne | ................ | F16M 11/041 38/104 |
| 4,729,535 A * | 3/1988 | Frazier | ................ | A47J 37/0786 224/406 |
| 5,640,949 A * | 6/1997 | Smith | ................ | B60R 9/06 126/30 |
| 6,701,913 B1 * | 3/2004 | LeDuc | ................ | F24C 15/30 126/30 |
| 7,281,646 B2 * | 10/2007 | Flannery | ................ | B60R 9/06 224/512 |
| 7,284,549 B1 * | 10/2007 | Eby | ................ | A47J 37/0713 126/25 R |
| 7,415,979 B1 * | 8/2008 | Macri | ................ | A47J 37/0763 126/41 R |

* cited by examiner

*Primary Examiner* — Muhammad Ijaz
(74) *Attorney, Agent, or Firm* — Pillsbury Winthrop Shaw Pittman LLP

(57) ABSTRACT

Provided in an adaptor and leveling base for mounting a grill to a utility vehicle and leveling the grill. Vertical legs of an adaptor may allow the adapter to mount via a mounting interface, such as spaced pockets of a side panel of a utility vehicle bed, or other vehicle mounted fixture, having pockets or brackets sized to receive and support the vertical legs. Support members coupled to the vertical legs may position a platform to which a grill is mounted in a use position, and alternatively, in a stowage position.

20 Claims, 5 Drawing Sheets

ADAPTER AND LEVELING BASE FOR UTILITY VEHICLE MOUNTED GRILL

CROSS-REFERENCE TO RELATED APPLICATIONS

No cross-reference to a related application is presented herewith.

BACKGROUND

1. Field

The present invention relates generally to outdoor cooking grills and, more specifically to a stowable adaptor with leveling base for mounting a cooking grill to a vehicle.

2. Description of the Related Art

Outdoor cooking grills have long been carried in the beds of trucks or other vehicles to a location at which they are removed, set on the ground, and utilized for a wide range of purposes. Often, the more portable and stowable a grill becomes, the less user friendly the grill is during use. Grills that are portable and stowable are nonetheless common choices of many users that rely on transportation of a grill to where it will be used. This is especially true in the case of utility vehicles, whether it be a truck or smaller all-terrain vehicle, like a side-by-side utility vehicle, with a stowable cargo area, like a bed.

SUMMARY

The following is a non-exhaustive listing of some aspects of the present techniques. These and other aspects are described in the following disclosure.

Some aspects include an adapter for mounting a load, like a grill, to a bed of a utility vehicle. Embodiments of an adaptor may comprise two adaptor legs having respective ends and first junctions, the adaptor legs having a spacing corresponding to a set of holes in a top of a side panel of a bed by which the ends are received, and each of the adaptor legs having a length of at least 4 inches configured for receipt within respective supportive channels via the set of holes; two support members extending down and away from the first junctions to second junctions, each support member being coupled to a respective one of the adaptor leg by a respective one of the first junctions; a cross support member disposed between the two support members and having distal ends coupled to a respective one of the support members by a respective one of the second junctions; a platform disposed between the distal ends of the cross support member and coupled to the cross support member; and a leveling base comprising: a body disposed within and supported circumferentially by the platform; a pivot ball disposed within the body; a pivot member extending from the pivot ball and the body of the leveling base to receive a load; and a pivot tensioner engaging a portion of a surface of the pivot ball and configured to frictionally resist a threshold of force exceeding at least a moment of force on the pivot ball resultant from supporting the load.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
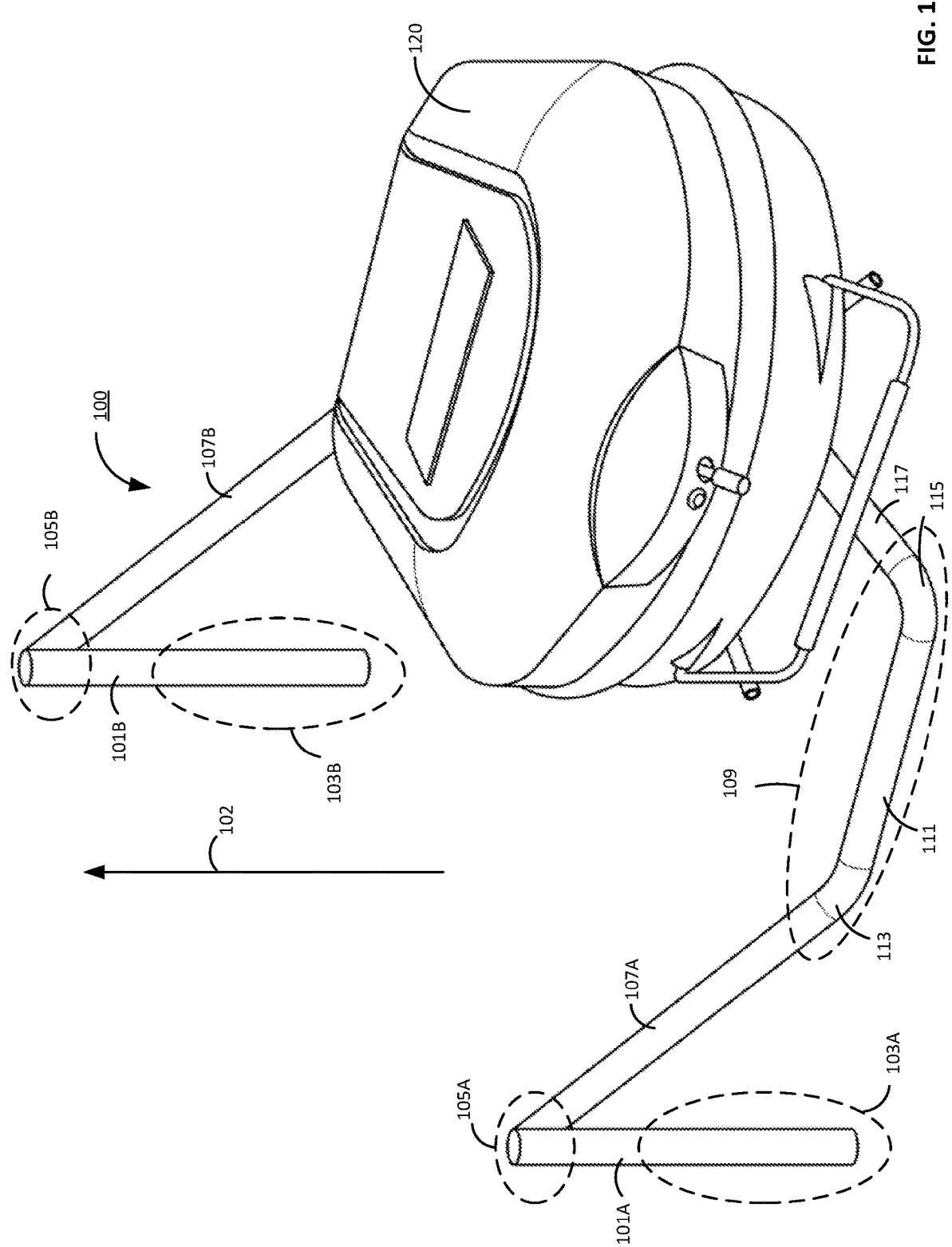
FIG. 1 illustrates an angled view of an example of a grill and an adaptor, in accordance with some embodiments.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of data center design. Indeed, the inventors wish to emphasize the difficulty of recognizing those problems that are nascent and will become much more apparent in the future should trends in the data center industry continue as applicants expect. Further, because multiple problems are addressed, it should be understood that some embodiments are problem-specific, and not all embodiments address every problem with traditional systems described herein or provide every benefit described herein. That said, improvements that solve various permutations of these problems are described below.

Designs for grills are separated by different design philosophies, between which there is relatively little interaction. On one side are those marketing designs of relatively small size that prioritize portability, such as for camping, tailgating, and the like which involve smaller grills and associated compromises imposed by the design on users. On the other side are those marketing designs of relatively large size that prioritize capacity and usability, such as for home use, which are far less practical to transport. Even so, many users transport such grills because of the increased usability they provide relative to more portable options. In either instance, after transportation of a grill, utilization of the grill requires the user to find level ground or a level surface to position the grilling apparatus or stand for the grill, and then varying degrees of configuring the grill for use. The degree of configuration largely varies based on design philosophy. Portable grills often require minimal configuration so long as the user found a good surface or level ground for placement of the grill. Larger grills often require more substantial configuration, especially in instances where the user must re-assemble multiple components due to having broken the grill down into multiple components for stowage during transport. In the alternative where the grill is transported in whole, the user (and often multiple users) must carefully lower the grill from its stowed location to level ground.

Particular challenges arise when attempting to use grills that subscribe to either philosophy in locations where level ground or other suitable surface for positioning of such grills is unavailable. If a grill is not level, users may be unaware of hazardous conditions that they typically do not encounter during use of the grill, such as catch pans (e.g., for grease) spilling over, hinge mechanisms failing to hold grill lids open, a lid when opened or positioned in a holder causing the grill to tip over, and other potential hazards resulting from the design tolerances of grills being expectant of a level surface (e.g., a surface having a normal vector substantially oriented to that of gravity). Even when users are aware of such hazards, constraints of a location at which a user desires to grill may be suboptimal and unavoidable without significant inconvenience.

Assumptions that users utilize grills under optimal circumstances have ignored solutions that might mitigate some of these challenges. To the extent any solutions that might mitigate some of these challenges have been considered under the prevalent design philosophies, they would face cost constraints or addition configuration steps that would make it difficult to justify expensive hardware for a limited user base that transports large grills or highly involved setup processes for portable grills that are at odds when either approach.

Embodiments of the adaptor and leveling base as described herein for mounting a grill to a utility vehicle are expected to afford efficient portability of a grill relative to large grills and provide enhanced usability relative to existing portable grills. Specifically, embodiments of the adaptor may interface with stable platform, like the sides of a utility vehicle bed, to provide a stable platform to which a grill may be mounted, and at a suitable height to a user (e.g., rather than near the ground or other surface at a suboptimal height). Further, disclosed embodiments, in consideration of the terrain utility vehicles may be located, address hazards like those noted above concerning use of a grill that is not leveled efficiently both in setup and in cost with a level base by which orientation of a mounted grill may be adjusted.

To mitigate some or all of these problems, and others, some embodiments, such as those shown in FIG. 1-5, implement an adaptor and leveling base for mounting a grill to a utility vehicle and leveling the grill relative to gravity to account for uneven terrain on which the utility vehicle may be positioned. Vertical legs of an adaptor may allow the adapter to mount via a mounting interface, such as spaced pockets of a side panel of a utility vehicle bed, or other vehicle mounted fixture, having pockets or brackets sized to receive and support the vertical legs. Support members coupled to the vertical legs may position a platform to which a grill is mounted in a use position, and alternatively, in a stowage position.

Switching between the positions, in some embodiments, may be afforded by a repositioning the vertical legs within a set of pockets, such as by removing the vertical legs from the pockets by lifting the apparatus, rotating the apparatus 180 degrees, and reinserting the vertical legs within the same set, or a different set of pockets of a mounting interface. The support members may have extension members that extend down and away from the vertical legs to position the platform at the usable or the stowable height and share a cross support member portion by which the respective first portions are coupled to distribute load, such as the weight of a grill. A leveling base coupled to the cross support member portion, like at approximately in the center of the cross support member to evenly distribute load, may include a grill attachment interface and provide at least some degree of freedom by which the grill may be oriented normal to gravity.

FIG. 1 illustrates an angled perspective view of an example of a grill and an adaptor 100, in accordance with some embodiments. Adapter 100 may include adapter legs 101, support members 107, cross member 117, and a base (not shown) to which a grill 120 mounts. The legs 101 and members 107, 117 may be constructed out of a suitable material to support the weight of the grill 120 or other load. Examples such materials for legs and members may be a metal, like steel or aluminum tubing, which may be square, rectangular, or circular (e.g., like drawn over mandrel (DOM) round steel tubing), or may be angle or U-channeled. In some examples, such as those utilizing DOM or square tubing, a plurality of joined members may be formed from a single monolithic tube. Thus, for example, adaptor legs, support members 107, and cross member 117 may be formed from a monolithic square or circular pipe tubing. Bend angles may range between 180 and 20 degrees, with a radius of the bend depending on tubing diameter and thickness. Bends of a desired angle my be formed by ram bending (e.g., a block of a desired radius being pressed by a ram towards one or more die blocks to form a given bend) or other suitable method.

In some embodiments, the adaptor legs 101 may be members that are substantially vertical with respect to a normal vector 102 of a plane that may correspond to the platform to which the grill 120 mounts. As shown, each adaptor leg 101A, 101B may include a respective adapting portion 103A, 103B which may mount to a suitable interface, as discussed in more detail with reference to the following figures. Each adaptor leg 101A, 101B may include, at an opposite end of the adapting portions, respective junctions 105A, 105B that coupled the adaptor legs to respective support members 107A, 107B.

In some embodiments, leg and member sizing may have a diameter (e.g., for circular tubing, but which may correspond to a cross sectional length, width, or diagonal for other types of tubing) between ¾ and 3 inches. In some cases, diameter of leg sizing may be restricted by pocket or bracket sizing by which the legs 101A, 101B interface with or are otherwise secured to another structure. Thus, a wall thickness of the legs may be selected in connection with a permissible diameter to support a load, like a grill, examples of which may weigh between 5 and 60 pounds.

Example configurations may support much heavier loads, and account for a safety margin of additional loading, such as by 2 times supported grill weight, or more, due to expected loads added to a grill (e.g., a pot filled with water) or a user otherwise applying a load. Support member 107 (and cross member 117) tubing may be selected to have a size similar to that of the adaptor legs, such as to facilitate direct welding at a respective junction 105, or may be of a different size and joined by a bracket or T-type (e.g., that includes a straight portion for a first fitted member, which may movable slide into and through the straight portion, and an angle is formed with a second fitted member, like between 0 and 180 degrees, and often between 15 and 165 degrees, when inserted) or elbow-type (e.g., that forms an angle between two fitted members, like between 0 and 180 degrees, and often between 15 and 165 degrees) junction.

In some embodiments, the support members 107A, 107B extend from their respective junctions 105A, 105B substantially parallel to each other, such as in the example shown.

In some other embodiments discussed herein, the support members 107A, 107B may angle towards or away from each other as they extend from the junctions 105A, 105B, such as to accommodate variable spacing between the adaptor legs 101. For example, support member 117 may be configured with a platform that includes a pivot assembly (not shown), such as one positioned at the center of the member, to permit alternation of the distance between the adaptor legs 101A, 101B by altering an angle formed by the support members 107A, 107B.

In some embodiments, support members 107 may extend from their respective junctions 105, such as to position the grill 120 away from a plane including the vertical axis of each adaptor leg. In some embodiments, support members 107 may also extend downwards from their respective junctions 105, such as to position a platform at a height lower than that of the junctions. Thus, for example, a height of a platform to which a grill 120 or other load may be mounted may be less than that of the junctions 105 of the support members and the adaptor legs 101.

Benefits of lowering the height of a platform to which the grill 120 mounts are two-fold. First, a height of a top surface of a side panel of a utility vehicle bed, over which the junctions are positioned (or may rest on), may be at a suboptimal height for use of a grill. Accordingly, a downward extension of the support members 107 when the adaptor legs 101 are mounted to the side panel for use of the grill can support a more optimal height for user operation of the grill.

Moreover, by repositioning one or more adaptor legs 101, such as by lifting or otherwise moving an adapting portion 103 from a corresponding mounting interfaces, and rotating the apparatus to position the grill 120 over the interior of a utility bed, and then reengaging the one or more removed adapting portions 103 the adaptor legs 101, a downward extension of the support members 107 when the adaptor legs 101 are mounted to the side panel for stowage of the grill reduces a height of the gill above a bed in the stowage position. For example, the platform to which the grill 120 mounts may rest on, or have a height less than 6 inches above the bed in the stowage position. Thus, in some embodiments, the grill 120 may be located partially, substantially, or wholly below a top of the junctions 105, and thus also partially, substantially, or wholly below a top a side panel of the utility bed when stowed.

In some embodiments, the support members 107 may include one or bends, such as to position a platform to which a grill 120 mounts to a desired distances away from a side panel of a utility bed and reduce height of the grill for use or when stowed. For example, as shown, support member 107A includes a bend 113 to transition from a slope that is downward and extends away from a side panel to a portion 109 that extends away from the side panel without a slope. An example bend 113 may be implemented by an elbow-type fitting (e.g., that forms an angle between two members forming the support member, e,g, 107A and 111, like between 0 and 180 degrees, and often between 15 and 165 degrees), or implemented by bending a single piece of support member tubing to a desired number of degrees (e.g., to form an angle between 90 and 180 degrees between portion 107A and 111 of the support member).

A corresponding bend (not shown) may be implemented with respect to support member 107B. Similarly, bend 115 (and a corresponding one not shown for support member 107B) may be implemented in a similar fashion to provide a fitting for cross support member 117 between support members 107A and 107B, or forming bend 115 (and the corresponding bend) by bending a single piece of support member tubing in respective locations to a desired number of degrees (e.g., 90 degrees as illustrated for a straight cross member 117 portion).

Figure 2:
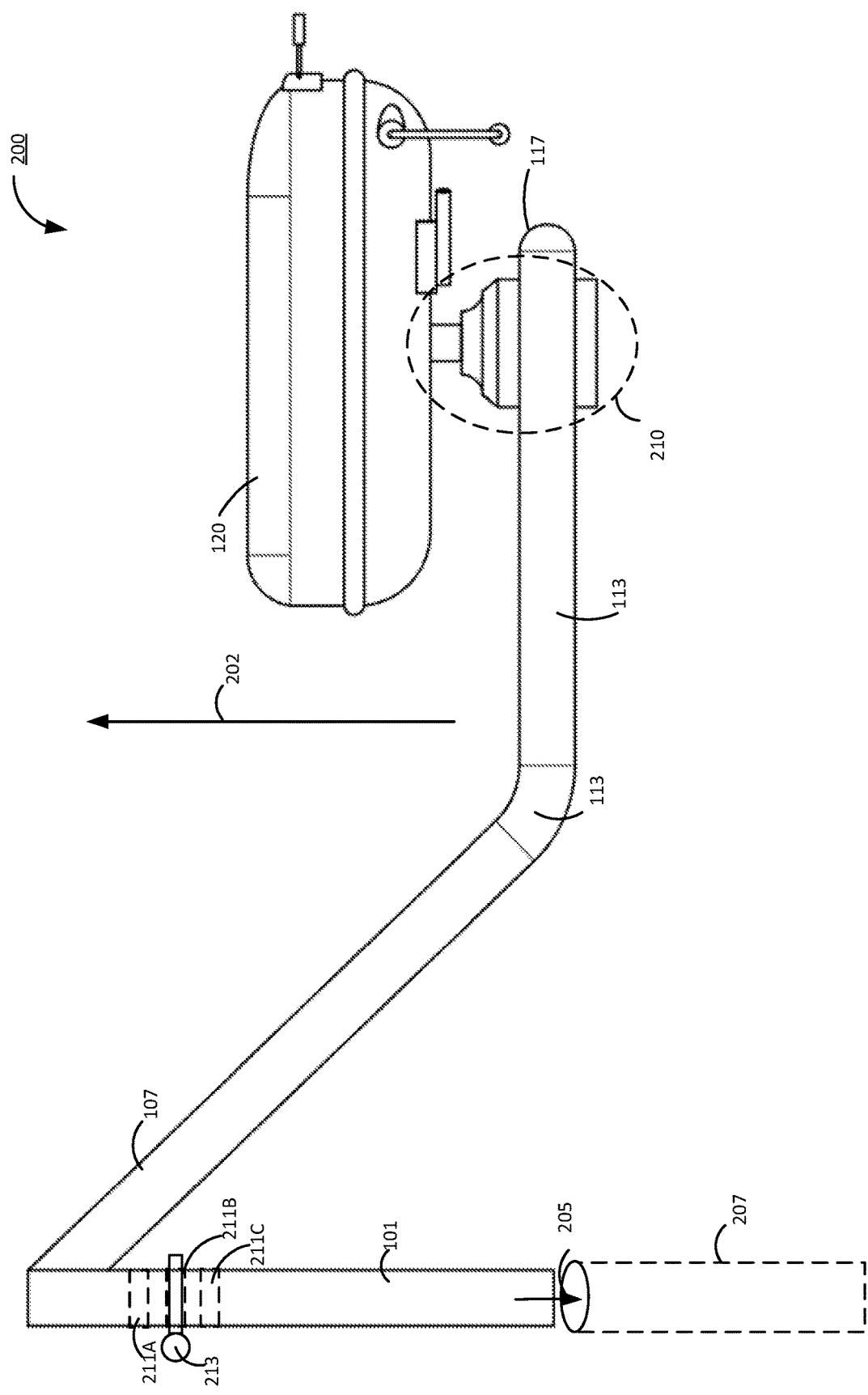
FIG. 2 illustrates a side view of an example of a grill and an adaptor with leveling base, in accordance with some embodiments.

FIG. 2 illustrates a side view of an example of a grill and an adaptor with leveling base 200, in accordance with some embodiments. Adapter 200 may include adapter legs 101, support members 107, cross member 117, and a base 210 to which a grill 120 mounts. As described previously, the legs 101 and members 107, 117 may be constructed out of a suitable material to support the weight of the grill 120 or other load.

FIG. 2 illustrates an example support member 107 with a first portion that slopes down and away from a side panel of a utility bed and a second portion 113 that extends away from the side panel of the utility bed after a bend 113 or junction between the two members. The second portion 113 that extend away from the side panel may extend a distance to permit the outside of the grill 120 to clear the downward sloping portions of the support members, such as to accommodate a distance between adaptor legs 101 (e.g., which may correspond to a length of the cross support member 117) being narrower than a width (or length) of a body of the grill 120.

Over the perspective view of FIG. 1, FIG. 2 illustrates an example leveling base 210 of a platform (not shown) by which the grill 120 is mounted to the adaptor 200. Additionally, FIG. 2 illustrates an example interface 207 by which an adaptor leg 101 may be mounted to the side panel of a bed of a utility vehicle, along with an example height adjustment configuration.

As shown, an adaptor leg 101 may be mounted via an example interface 207 of a side a utility bed. One example interface 207 as shown may include a channel, like a pocket, into which an adaptor leg 101 may be inserted. Some embodiments may utilize a bracket, such one formed by two U-shaped (or square channel shaped) backets mounted to a side of a utility bed (or other surface) in distanced to relation of each other by which the adaptor leg may be secured at two points along its length.

In various example embodiments, a side panel of a utility bed may include openings at the top of the side of the bed that lead into the pocket interface 207 to receive 205 an adaptor leg 101 as shown. For example, a bottom of an adaptor leg 101 may be lowered into the pocket interface 207, and the channel of the interface (e.g., circular, or square, or a rectangular channel extending lengthwise along the side of the bed) may be receive 205 one or more adaptor legs. Some embodiments of a side of a utility bed may include multiple such interfaces 207 in spaced relation, and a pair of such interfaces may receive respective adaptor legs having a spaced relation to each other that corresponds to the pair of interfaces.

As described previously, an outer dimension, like a diameter, of the adaptor legs 101 may be sized with respect to the interface 207, such as to allow sufficient clearance for insertion 205 of an adaptor leg. For example, the difference between an outer dimension of an adaptor leg 101 and a corresponding dimension of the interface 207 for receiving the leg may be more than 0.01 of an inch to enable insertion, but less than 0.5, or 0.2, or 0.1 of an inch, to mitigate movement or rattling of the legs within the interface, such as during transport of the grill or use of the grill.

In some embodiments, a height at which an adaptor leg 101 rests on the top of a side of a utility bed when inserted 205 into an interface 207 may be limited by a pin 213 or similar mechanism that extends from one or more sides of an adaptor leg 101, thereby preventing the adaptor leg 101 from insertion into the interface 207 beyond the location of the pin 213 or other limiting mechanism. In examples utilizing a pin 213, a number of channels 211A, 211B, 211C to receive the pin 213 at different heights along the adaptor to adjust the height at which the platform (and thus the grill 120) is positioned.

In some embodiments, the adaptor 200 includes a leveling base 210 to which the grill 120 is mounted. Embodiments of the leveling base 210 may permit the grill 120 to cant relative to the adaptor 200. Thus, for example, when a vector 202 normal to the adaptor 200 (and parallel to the adaptor legs 101) is not parallel to a gravity vector, the grill 120 may be canted via the leveling base 210 to orient the grill normal to gravity (e.g., similar to if it were placed on flat ground normal to a vector of the force of gravity). Example level bases 210 may permit cant in 360 degrees around its axis, and cant up to 20, 30, or even 45 degrees as discussed in more detail with reference to the following figures.

Figure 3:
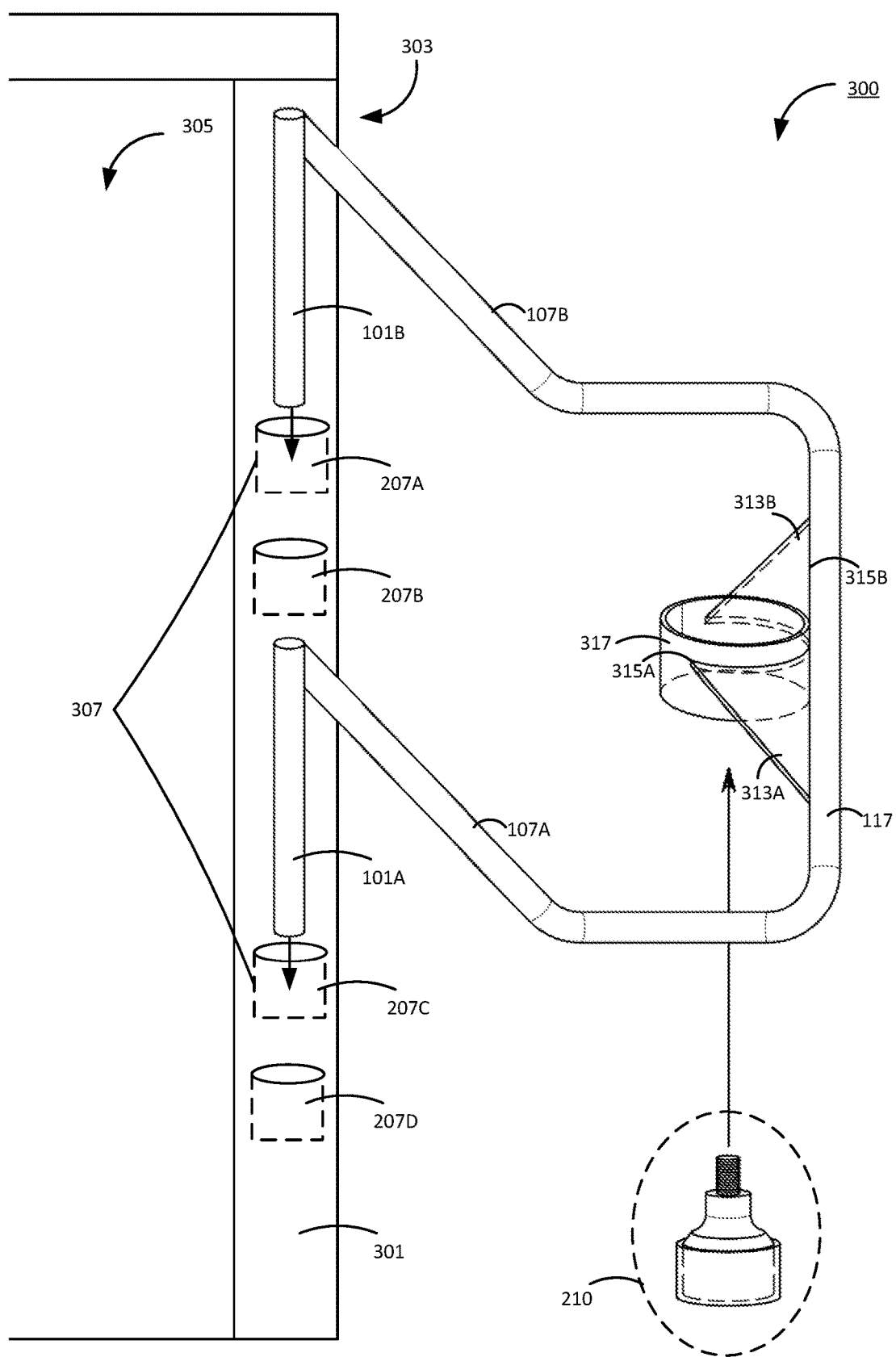
FIG. 3 illustrates a top view of an example of an adaptor with leveling base for mounting a grill to a utility vehicle, in accordance with some embodiments.

FIG. 3 illustrates a top view of an example of an adaptor with leveling base 300 for mounting a grill to a utility vehicle, in accordance with some embodiments. Adapter 300 may include adapter legs 101, support members 107, cross member 117, platform 317, and a leveling base 210. As described previously, the legs 101 and members 107, 117 may be constructed out of a suitable material to support the weight of a grill or other load.

Over the view of FIG. 2, FIG. 3 illustrates additional aspects of an example interface 207 of a side panel 303 of a bed 305 of a utility vehicle. FIG. 3 also illustrates an example platform 317 by which an example leveling base 210 is coupled to the adaptor 300 for mounting of a grill.

As shown, an example interface 207 may be configured within a side panel 303 of a bed 305 of a utility vehicle. In some embodiments, a top 301 of the side panel 303 may include a number of holes to provide access to corresponding channels within the side panel 303 to provide an interface 207 for receipt of adaptor legs 101.

Specifically, a number of interface pockets 207A-207D may be provided and each may be disposed in a spaced relation to one or more other pockets. For example, at least one set 307 of interface pockets 207A, 207C may be disposed in a spaced relation to each other that corresponds to the distance between adaptor leg 101A and 101B. Thus, interface pocket 207A may receive adaptor leg 101A and interface pocket 207C may receive adaptor leg 101B as shown. One or more other sets of pockets (e.g., 207B, 207D) may also be disposed in the same spaced relation to afford positioning of the adaptor 300 within different sets of interface pockets along the length of the side panel 303.

Example interface pockets 207 may have respective channels with depths of 2 or more inches, like more than 3 inches, and often between 6 and 12 inches, to support up to a corresponding length of an adaptor leg 101. The adaptor leg 101 may be supported up to a junction between a leg and support member, or limiting mechanism (e.g., as described with reference to FIG. 2), or up to a depth of a channel. The channels may mitigate lateral and forward/aft movement, and in various embodiments support the legs from moving substantially forward or aft along a normal vector of a plane corresponding to a face of a side of a bed of a utility vehicle.

In some embodiments, at least one set 307 of interfaces 207 is spaced between 12 and 36 inches apart, like 24 inches apart, and the adaptor legs 101A, 101B are spaced a similar distance apart. In some embodiments, the spacing of adaptor legs 101A, 101B may be adjustable to mount to a set of interfaces with different spacing. For example, the spacing between adaptor legs 101A, 101B may be adjustable via lengthening or shortening of the cross member 117 (e.g., via a T-type junction between the cross member and one or both support members 107).

In another example, the cross member 117 may include a hinge, or platform 217 may include a hinge, by which the support members 107 and thus the adaptor legs 101A, 101B may be spread apart. In some examples, hinge functionality may be afforded by one or more pivot points for coupling respective center ends of a two-piece support member 117 to platform 317 or bracket 313 and respective slots (e.g., in the backet 313) for securing each piece of the two-piece support member.

In the illustrated embodiment, a platform 317 for receiving the leveling base 210 is coupled to support member 117 by a bracket 313. The platform 317 may be coupled to a bracket having one or more supporting sections. For example, a first bracket portion 313A and a second bracket portion 313B to support the platform 317, respectively, around 25% or more of its circumference to collectively support the platform 317 around 50% or more of its circumference. In some embodiments, the coupling of the platform 317 and the bracket 313 comprises one or more welds 315A. The bracket 313 (or portions thereof 313A, 313B) may similarly be welded 315B along a junction (or respective junctions) with the cross member 117.

Some embodiments may alternatively utilize one or more fasteners, or hinges, or combination of hinges, fasteners, and welds to securely couple the platform 317, bracket(s) 313, and support member 117 (or sections thereof). A secure coupling need not mean fixed, as embodiments including a hinge (or providing such functionality via a fastener configuration) may afford secure coupling without being permanently fixed, rather secure coupling should be understood to provide rigidity for receipt of a load when the adaptor legs 101A, 101B are distanced within a permissible range of adjusted and disposed within a set of interface pockets.

Additionally, as shown, the platform 317 may receive a leveling base 210. The leveling base 210 may be retained by one or more fasteners within the platform 317 once received. In some examples, the leveling base 210 may be press fit into the platform 317, and optionally retained my one or more fasteners. Additional examples are discussed with reference to FIG. 4.

Figure 4:
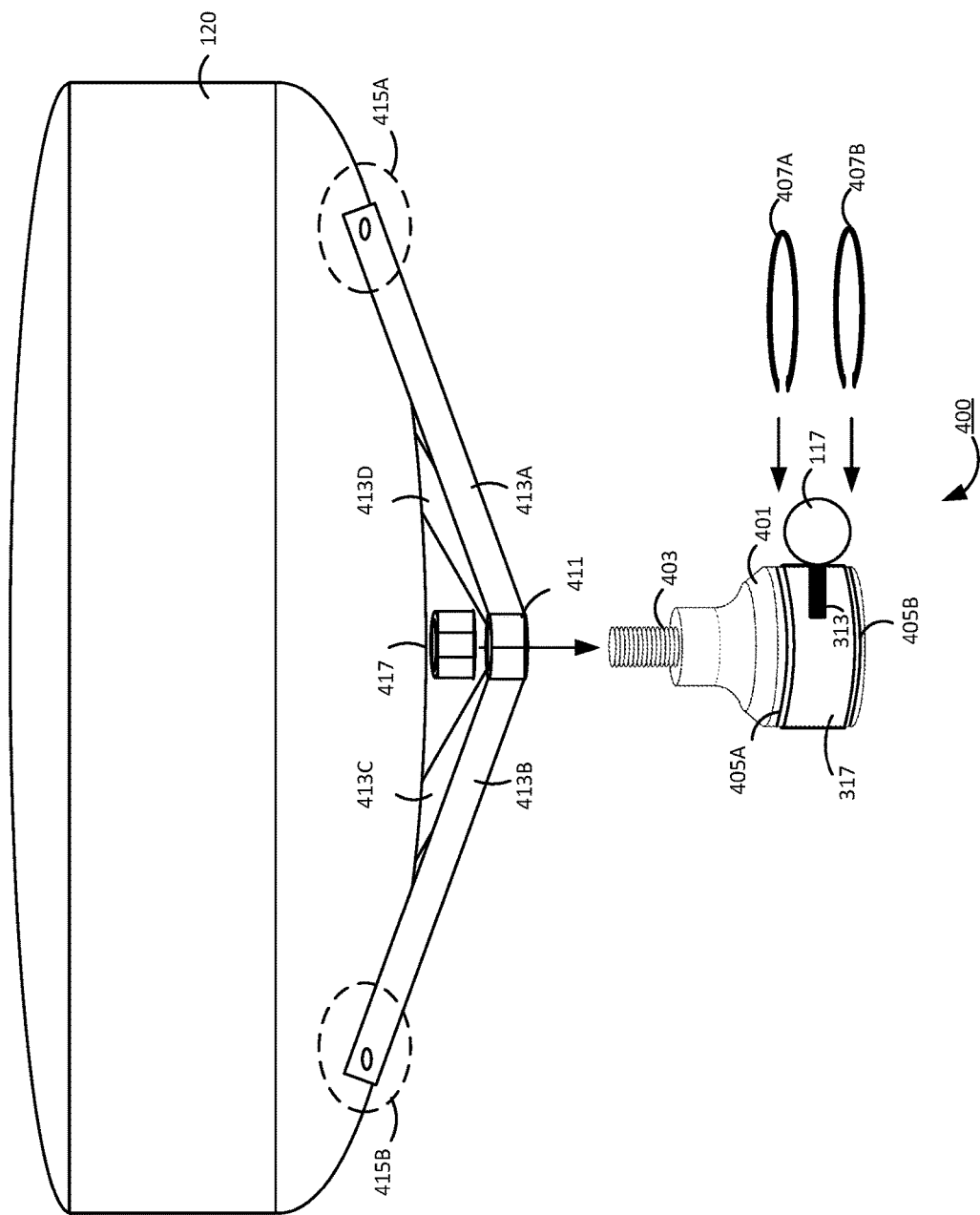
FIG. 4 illustrates a side view of an example of a leveling base of an adaptor for mounting a grill to a utility vehicle, in accordance with some embodiments.

FIG. 4 illustrates a side view of an example of a leveling base 400 of an adaptor for mounting a grill 120 to a utility vehicle, in accordance with some embodiments. As shown, platform 317 may be coupled to a bracket 313 by which the platform is secured to a cross support member 117.

In some example embodiments, a body 401 of the leveling base, examples of which may be substantially circular and received by a circular platform 317, may have an interference or press fit within the platform 317, or a minimum tolerance to mitigate movement within the platform.

In some embodiments, the body 301 of the leveling base 400 may include one or more circumferential channels 405 by which a respective fastener 407 is received. For example, receipt of a first C-Clip fastener 407A by circumferential channel 405A can prevent the body 401 of the example leveling base 400 from sliding downwards and out of the platform 317. Thus, for example, when a load, like a grill 120, is mounted to the leveling base 400, the body 401 cannot slide downwards in the platform 317. Similarly, in some embodiments, a second C-Clip fastener 407B received in channel 405B can prevent the body 410 of the example leveling based 400 from sliding upwards and out of the platform 317. Other embodiments may utilize different configurations of fasteners, like one or more set screws, or bolts, that secure the body 401 within the platform 317.

As shown, an example leveling base 400 may include a pivot member having a threaded portion 403 by which load may be received. For example, the threaded portion 403 may be inserted into a corresponding hole within the base of a grill 120 and secured with a nut having a corresponding thread pitch. In other example embodiments, such as that shown, a supportive grill base may have a corresponding hole 411 by which the threaded portion 403 of the pivot member may be received, and which may provide clearance between the bottom of the grill 120 and the hole 411 for utilization of a nut, like a lock nut, to secure the supportive grill base to the threaded member 403 portion.

In some embodiments, the hole 411 may include corresponding threads to the threaded member 403 portion and the nut 417 may function as a jam nut (e.g., to mitigate rotation of the grill base when so jammed to prevent rotation of the threaded hole 411 on the threads of the member 403). The base need not rotate around the threaded portion 403 of the pivot member as the pivot member may provide 360 degree rotation (but with resistance to prevent unwanted rotation).

An example supportive grill base, as shown, may include a hole 411 for mounting of the base to a threaded portion 403 of a pivot member, at least some, like 3, or 4 as shown, grill supporting members 413A, 413B, 413C, 413D for receipt and support of a grill 120. As shown, example supportive members 413A, 413B may be respectively secured at junctions 415A, 415B with a body of the grill 120, and supportive members 413C, 413D, may be similarly secured to the body of the grill 120. In some examples, the junctions 415A, 415B may be welded, riveted, or bolted to the grill body.

In some examples, one or more junctions 415 may be formed at existing interfaces of the grill body. Thus, for example, an adjustable or different supportive grill bases may be provided to accept a variety of grills having different dimensions or different mounting interface dimensions. In other words, an adjustable supportive grill base, or different supportive grill bases, may offer compatibility with a variety of different models and sizes of grill 120.

Figure 5:
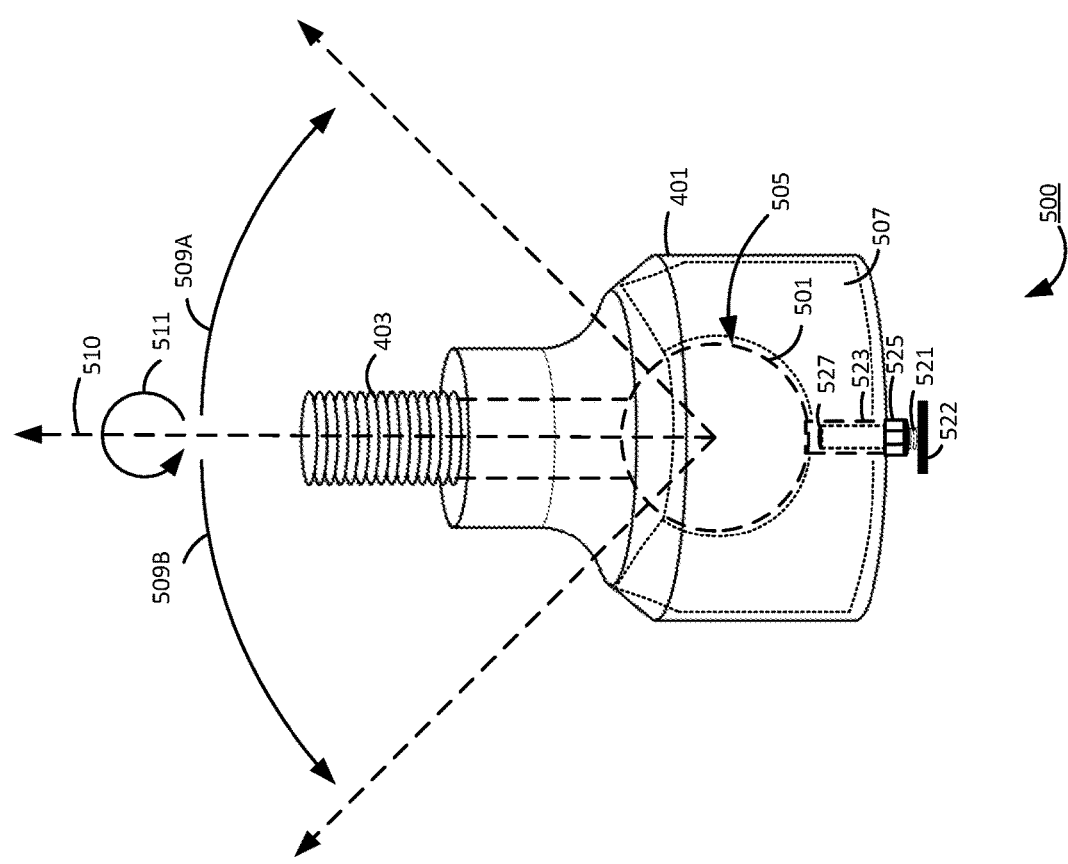
FIG. 5 illustrates a side view of an example of a leveling base, in accordance with some embodiments.

FIG. 5 illustrates a side view of an example of a leveling base 500, in accordance with some embodiments. As previously described, a body 401 of the leveling based 500 may be supported circumferentially by a platform of an adaptor, and may be affixed within the platform, whether by press fitting or fasteners, or a combination thereof, to prevent unwanted removal.

As shown, a body 401 of the leveling base 500 may house a pivot ball 501. The body 410 may include a pocket 505 within which the pivot ball is disposed. The pocket 505 may be formed within a pivot tensioner 507, which may also be disposed within the body 401. The pivot tensioner 507 may be a plastic, rubber, or metal material configured to contact at least 50%, and in some cases, 66% of the surface of the pivot ball 501 to apply friction to the pivot ball. The pivot ball 501 may be round, and as such, rotatably disposed within the pivot tensioner 507 to permit rotation around an axis 510 corresponding to the pivot member. In the illustrated example, axis 510 also corresponds centerline axis of the body 401 of the leveling base 500.

As shown, the pivot tensioner 507 includes a circumferential opening through which the pivot member 403 attached to the pivot ball 501 may extend. Thus, for example, the pivot member 403 may extend from the pivot ball 501 and from the body 401 of the leveling base 501 to receive a load, such as via a threaded portion of the pivot member 403. In some example embodiments, the pivot tensioner 507 applies an amount of passive friction to the pivot ball 501, such as to frictionally resist a threshold of force exceeding at least a moment of force on the pivot ball resultant from supporting of a grill or other load, such as after such a load is mounted to pivot member 403.

Thus, in example use cases, such as to account for position of a utility vehicle on uneven ground which may position the centerline axis of the body 401 in a direction different from a vector of gravity, the pivot tensioner 507 may tension the loaded pivot member 403 to prevent the load from drooping from a set position but also permitting repositioning of the loaded pivot member 403 and thus the grill into a position level with gravity. The tension applied by the pivot tensioner 507 may also prevent the grill from drooping (or falling) from unbalanced positioning of further loads (e.g., food) on the grill (i.e., due to resisting the moment of force resultant from the uneven load).

As shown, the pivot ball 501 is rotatably disposed within the pivot tensioner 507. Thus, the pivot member 403 may be rotated 511 around the axis 510 of the pivot member 403 to orient a load, like grill, having a front, in a given direction. Further, an axis of the pivot member 403 may be canted in either direction 509A, 509B along an arc with multiple degrees of freedom relative to an axis of a centerline of the body 410.

The pivot member 403 may be rotatable along a circumferential arc around the centerline axis of the body, and also rotated around its axis while canted from the centerline axis of the body along a given arc 509.

In some embodiments, the pivot tensioner 507 permits cant of an axis of a pivot member 403 between 15 and 45 degrees from a centerline axis of the body 401. In some examples, the pivot tensioner 507 permits cant up to at least 25 degrees, or 32 degrees, and in some cases 35 degrees or more. Thus, a pivot member may cant at least 25 degrees from an axis of a centerline of the body and along an arc of 360 degrees.

In some embodiments, multiple tensioning portions are utilized. For example, a passive tensioning portion 507 may engage a relatively large portion of the surface of the pivot ball to frictionally resist a threshold of force exceeding at least the moment of force on the pivot ball resultant from supporting a given (e.g., expected) load (e.g., up to 100 pounds or more, but typically less than 120 pounds). Thus, for example, a user may apply additional force to generate a moment of force exceeding the threshold of the passive tensioner to reorient a load.

A second tensioning portion may be an active tensioning portion, and is active in the sense that the user may activate the active tensioner to increase resistance above that provided by the passive tensioner while the active tensions is not engaged. Some example active tensioners may compress the passive tensioner 507, or halves of a two-piece passive tensioner, against the surface (or respective surfaces) of the pivot ball 501. For example, clamp or a tapered interior of the body may compress the passive tensioner 507 when activated by a lever.

In another example, an example an active tensioning portion may include a set screw 521, the depth of which in a channel 523 permitting engagement of a top 527 of the set screw with the pivot ball 501 may be adjustable, such as by an external interface 522 accessible to a user. For example, a threaded nut 525 may be disposed on a body 401 of the leveling base 500 to permit threading of the set screw 512 deeper into (and back out of) the channel for tension adjustment by a tool or integrated T handle 522 for toolless use. In some embodiments, a tip 527 of a set screw 512 may have a polymer or rubber materialled insert or cap to prevent marring of the pivot ball 501.

Accordingly, an active tensioning portion may apply additional friction to a second portion of the surface of the pivot ball 501, or as described in other examples, the active tensioning portion may engage a passive tensioning portion (e.g., by compression thereof against a surface of the pivot ball) to apply additional friction to the portion of the surface of the pivot ball engaged by the passive portion. Thus, for example, the user may orient a load as desired, without the load dropping from a desired orientation under passive tension, and then engage the active tensioner to substantially retain the load in the desired orientation.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more components performing steps A, B, C, and D) encompasses both all such attributes or functions being mapped to all such objects and sub sets of the attributes or functions being mapped to subsets of the attributes or functions (e.g., both all components each performing steps A-D, and a case in which component 1 performs step A, component 2 performs step B and part of step C, and component 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors.

What is claimed is:

1. An adapter for mounting a load to a bed of a utility vehicle, the adapter comprising:
    two adaptor legs having respective ends and first junctions, the adaptor legs having a spacing associated with a set of holes in a top of a side panel of the bed of the utility vehicle by which the ends are received, and each of the adaptor legs having a length of at least 4 inches configured for receipt within respective supportive channels via the set of holes;
    two support members extending down and away from the first junctions to second junctions, each said support member being coupled to a respective one of the adaptor leg by a respective one of the first junctions;
    a cross support member disposed between the support members and having distal ends coupled to a respective one of the support members by a respective one of the second junctions;
    a platform disposed between the distal ends of the cross support member and coupled to the cross support member; and
    a leveling base comprising:
        a body disposed within and supported circumferentially by the platform;
        a pivot ball disposed within the body;
        a pivot member extending from the pivot ball and the body of the leveling base to receive a load; and
        a pivot tensioner engaging a portion of a surface of the pivot ball and configured to frictionally resist a threshold of force exceeding at least a moment of force on the pivot ball resultant from supporting the load.

2. The adapter of claim 1, wherein:
the adaptor legs, the support members, and the cross support member are formed from a monolithic body of material.

3. The adapter of claim 2, wherein:
each junction is formed in a single length of metal tubing to form respective ones of the support members or the cross member.

4. The adapter of claim 1, wherein:
the spacing of the adaptor legs is between 12 and 36 inches and associated with multiple different sets of holes in the top of the side panel having the associated spacing.

5. The adapter of claim 1, wherein:
the adaptor legs are laterally supported along a direction of the support members within the channels and vertically removable from the set of holes.

6. The adapter of claim 1, wherein:
the support members extend down and away from the first junctions to position the platform less than 6 inches above the bed of the utility vehicle in a stowed position.

7. The adaptor of claim 1, wherein:
the pivot ball is rotatably disposed within the pivot tensioner and rotatable around an axis of the pivot member.

8. The adapter of claim 1, wherein:
the pivot ball is rotatably disposed within the pivot tensioner and an axis of the pivot member cants with multiple degrees of freedom relative to an axis of a centerline of the body by at least 20 degrees.

9. The adapter of claim 1, wherein:
the pivot member cants at least 25 degrees from an axis of a centerline of the body along an arc of 360 degrees.

10. The adaptor of claim 1, wherein:
the pivot tensioner engages at least 50% of the surface of the pivot ball.

11. The adaptor of claim 1, wherein the pivot tensioner comprises:
a passive tensioning portion; and
an active tensioning portion.

12. The adapter of claim 11, wherein:
the passive tensioning portion engages the portion of the surface of the pivot ball and frictionally resists the threshold of force exceeding at least the moment of force on the pivot ball resultant from supporting the load.

13. The adaptor of claim 11, wherein:
the active tensioning portion applies additional friction to a second portion of the surface of the pivot ball.

14. The adapter of claim 13, wherein:
the active tensioning portion engages the passive tensioning portion to apply additional friction to the portion of the surface of the pivot ball.

15. The adaptor of claim 1, further comprising:
a supportive base to receive the load, the supportive base comprising a mounting portion to engage the pivot member.

16. The adaptor of claim 15, wherein:
the load is a grill and the supportive base is coupled to a body of the grill by at least 3 grill supporting members.

17. The adapter of claim 1, wherein:
a height of the first junctions above the top of the side panel of the bed is adjustable.

18. The adaptor of claim 17, wherein:
adjustment of the height of the first junctions above the top of the side panel positions the platform less than 6 inches from the bed of the utility vehicle in a stowed position.

19. The adaptor of claim 1, wherein:
a distance of the spacing between the adaptor legs is adjustable.

20. The adaptor of claim 19, further comprising:
at least one hinge.

* * * * *